(12) United States Patent  
Watson

(10) Patent No.: US 6,497,251 B1  
(45) Date of Patent: Dec. 24, 2002

(54) HYDRAULIC LATCHING SPOOL VALVE

(75) Inventor: Richard R. Watson, Missouri City, TX (US)

(73) Assignee: Gilmore Valve Co., Ltd., Houston, TX (US)

( * ) Notice: Subject to any disclaimer, the term of this patent is extended or adjusted under 35 U.S.C. 154(b) by 0 days.

(21) Appl. No.: 09/923,379

(22) Filed: Aug. 6, 2001

(51) Int. Cl.[7] ............................................... F15B 13/042
(52) U.S. Cl. ..................................... 137/625.66; 91/426
(58) Field of Search ........................ 91/426; 137/625.66

(56) References Cited

U.S. PATENT DOCUMENTS

| | | | |
|---|---|---|---|
| 3,015,317 A | * | 1/1962 | Buchanan et al. ..... 137/625.62 |
| 3,670,771 A | | 6/1972 | Dewberry |
| 3,805,837 A | | 4/1974 | Stampfli |
| 4,073,313 A | | 2/1978 | Smallwood |
| 4,105,047 A | | 8/1978 | Smallwood |
| 4,336,827 A | | 6/1982 | Golan |
| 4,848,404 A | * | 7/1989 | Hickok ........................ 91/426 |
| 5,901,749 A | | 5/1999 | Watson |
| 6,209,565 B1 | | 4/2001 | Hughes et al. |

* cited by examiner

Primary Examiner—Gerald A. Michalsky  
(74) Attorney, Agent, or Firm—Blackwell Sanders Peper Martin LLP

(57) ABSTRACT

A hydraulic latching spool valve has at movable piston and valve cage defining two seats. In the valve cage, a moveable piston is operable to move the valve into open and closed positions. A spring positioned in a pilot close chamber urges the piston to close. A pulse of fluid pressure at a pilot open chamber causes the piston to open. A latching chamber is formed on the interior of the piston, the latching chamber being exposed to supply pressure when the piston is in the open position. Accordingly, in the open position, supply fluid in the latching chamber generates sufficient latching force to overcome opposing forces generated by the sprig. The supply pressure holds the piston in the open position until a pulse of fluid pressure is applied to the pilot close chamber, thereby causing the valve to close.

8 Claims, 3 Drawing Sheets

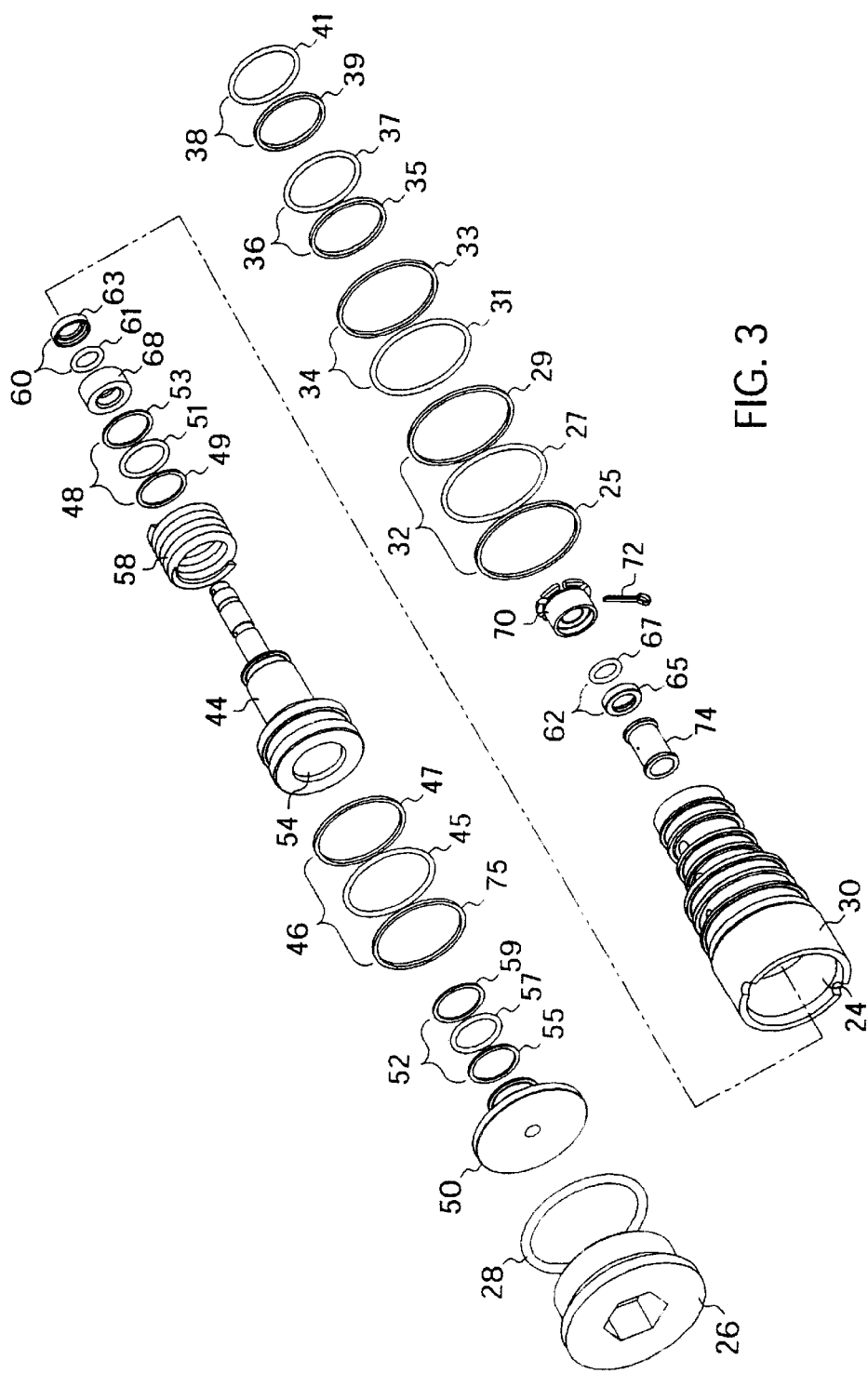

HYDRAULIC LATCHING SPOOL VALVE

BACKGROUND OF INVENTION

This invention relates generally to a hydraulic latching spool valve and more specifically concerns a valve having a latching chamber formed in the interior of an elongate movable piston. The latching chamber is in fluid communication with the supply pressure to the valve and has an area exposed to the supply pressure that generates sufficient latching force to overcome opposing forces and latch the valve in the open position after an initial pulse of open fluid pressure.

Hydraulic valves are used in a variety of applications to control flow in hydraulic circuits. While pilot operated poppet valves have been employed for many years, recent changes in control system design have rendered traditional poppet valves less than optimal. With traditional valves, hydraulic pilot pressure is applied and maintained in order to open the valve and keep it in an open position. A poppet valve that was designed for use in a traditional hydraulic system is disclosed in U.S. Pat. No. 5,901,749 assigned to Gilmore Valve Co., the assignee of the present invention. The valve disclosed in this patent requires constant pilot pressure to stay open. If pilot pressure unintentionally drops for any reason, the valve will close because of spring force. This sometimes results in the unintentional closure of a valve.

Maintaining a constant pilot pressure to keep the valve open has a number of drawbacks.

Any hydraulic system can be troubled by leaks, and keeping a valve under constant pilot pressure may be difficult if there are leaks in the system. Further, maintaining constant pilot pressure requires energy. Thus, control systems have shifted to a design in which pilot pressure need only be pulsed in order to open the valve, and then released. There is, therefore, a need for a valve design capable of latching in the open position after only a brief pulse of pilot pressure. The term "pulsed" as used herein means that a pilot is opened and pressurized fluid is directed to a desired apparatus, for example the present invention, for 2 to 3 seconds, and then the fluid is vented and pressure falls to zero psi.

A previous attempt to address this need can be found in U.S. Pat. No. 6,209,565, however the device described suffers from several problems. For example, the device is needlessly complicated. It uses two pistons, i.e. the pilot open piston and a second piston (called a head) in the latching piston assembly. Two moving pistons require additional seals that increase the potential for leakage and failure. There is, therefore, a need for a simple, elegant valve that does not require constant pilot pressure in order to keep it in an open position.

SUMMARY OF INVENTION

The present invention provides a simple valve design that is able to remain open without constant pilot pressure, and that minimizes the risk of leakage due to the fluid pressure holding the valve open. Briefly, the present invention is a hydraulic latching spool valve which is adapted to be inserted into a valve chamber in a body. Some end users of the hydraulic latching spool valve have bodies that receive the valve and others do not. Therefore the hydraulic latching spool valve may be sold with or without a body. The valve body defines a supply port, a function port, a vent port, a pilot close port, and a pilot open port. The supply port is connected to a pressurized fluid source which delivers supply pressure to the spool valve. The pilot close port is connected to a close pilot to deliver close fluid to the spool valve when the close pilot is pulsed. The pilot open port is connected to an open pilot to deliver open fluid to the spool valve when the open pilot is pulsed.

The spool valve itself comprises a valve cage, a seal assembly carried by a moveable elongate piston, a spring, a pilot open chamber, a pilot close chamber, and a latching chamber. The valve cage is sized and arranged to be inserted into the valve chamber of the body. The valve cage defines an upper circular seat positioned between a valve supply port and a valve function port, and a lower circular seat positioned between the valve function port and a valve vent port. The seal assembly is carried by an elongate moveable piston. The piston moves from a closed position, in which the seal assembly is engaged with the first seat and disengaged with the second seat, to an open position, in which the seal assembly is engaged with the second seat and disengaged with the first seat. The spring is positioned within a chamber in fluid communication with the pilot close port and urges the piston into the closed position. The pilot open chamber is in fluid communication with the pilot open port and serves to retain fluid that exerts pressure on the head of the piston, causing the piston to move from a closed position to an open position where the piston is actuated.

The latching chamber is formed within the interior of the elongate moveable piston and is in fluid communication with the supply pressure when the valve is in the open position. The latching chamber has an area exposed to the supply pressure that generates sufficient latching force to overcome the opposing forces generated by the spring and the supply pressure acting against the piston. Thus, when the open pilot is pulsed, the elongate moveable piston moves to the open position and supply pressure fills the latching chamber. The piston is then held in the open position until the close pilot is pulsed, which added pressure combines with the pressure exerted by the spring to force the piston into the closed position. These and other features, aspects, and advantages of the present invention will become better understood with regard to the following description, appended claims, and accompanying drawings.

BRIEF DESCRIPTION OF DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted, however, that the appended drawings illustrate only a typical embodiment of this invention and are therefore not to be considered limiting of its scope, for the invention may admit to other equally effective embodiments.

FIG. 3 is an exploded view of the hydraulic latching spool valve showing the three-dimensional structure and spatial relationship of the valve components.

DETAILED DESCRIPTION

Figure 1:
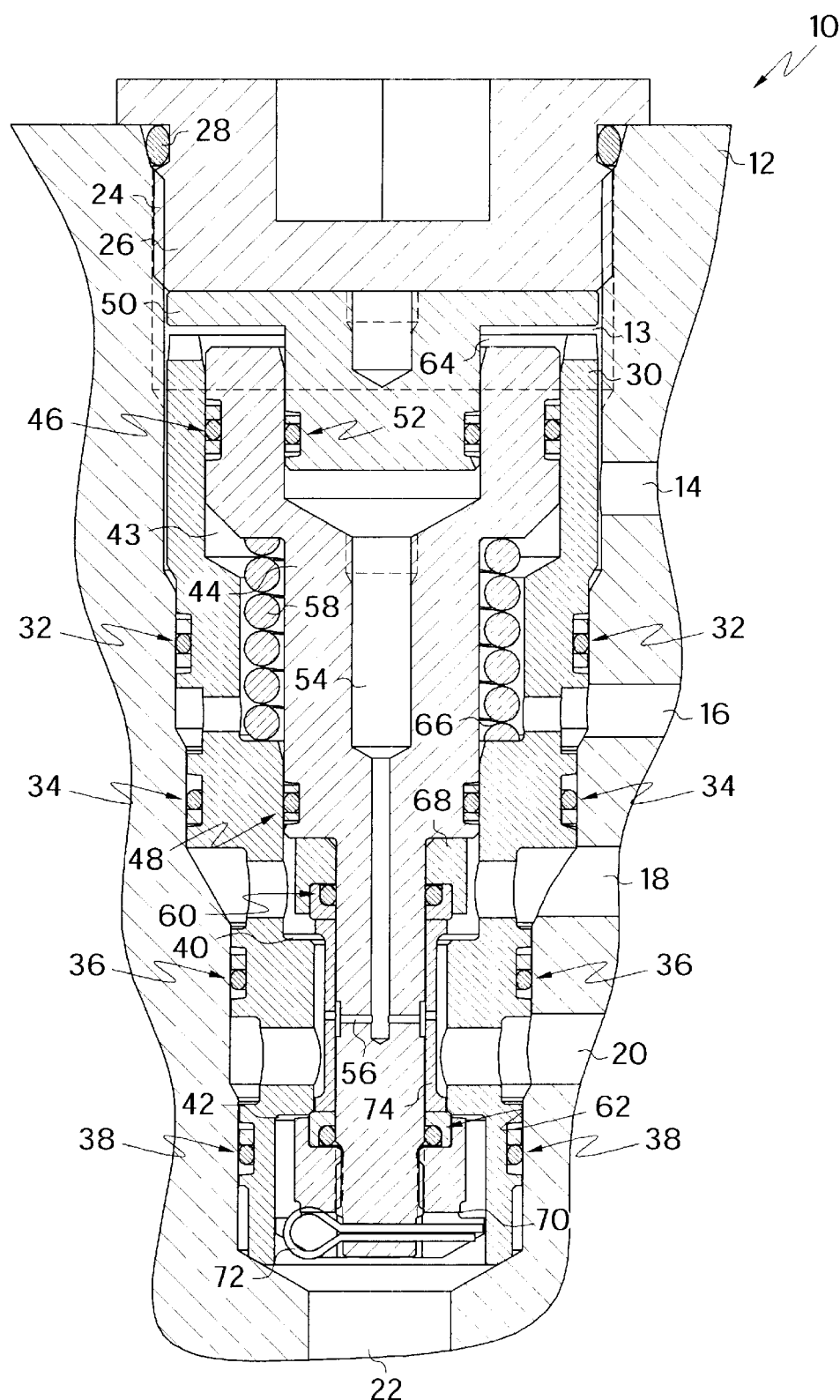
FIG. 1 is a section view of a portion of the body and of the hydraulic latching spool valve of the present invention. The internal valve components are in the closed position.
Figure 2:
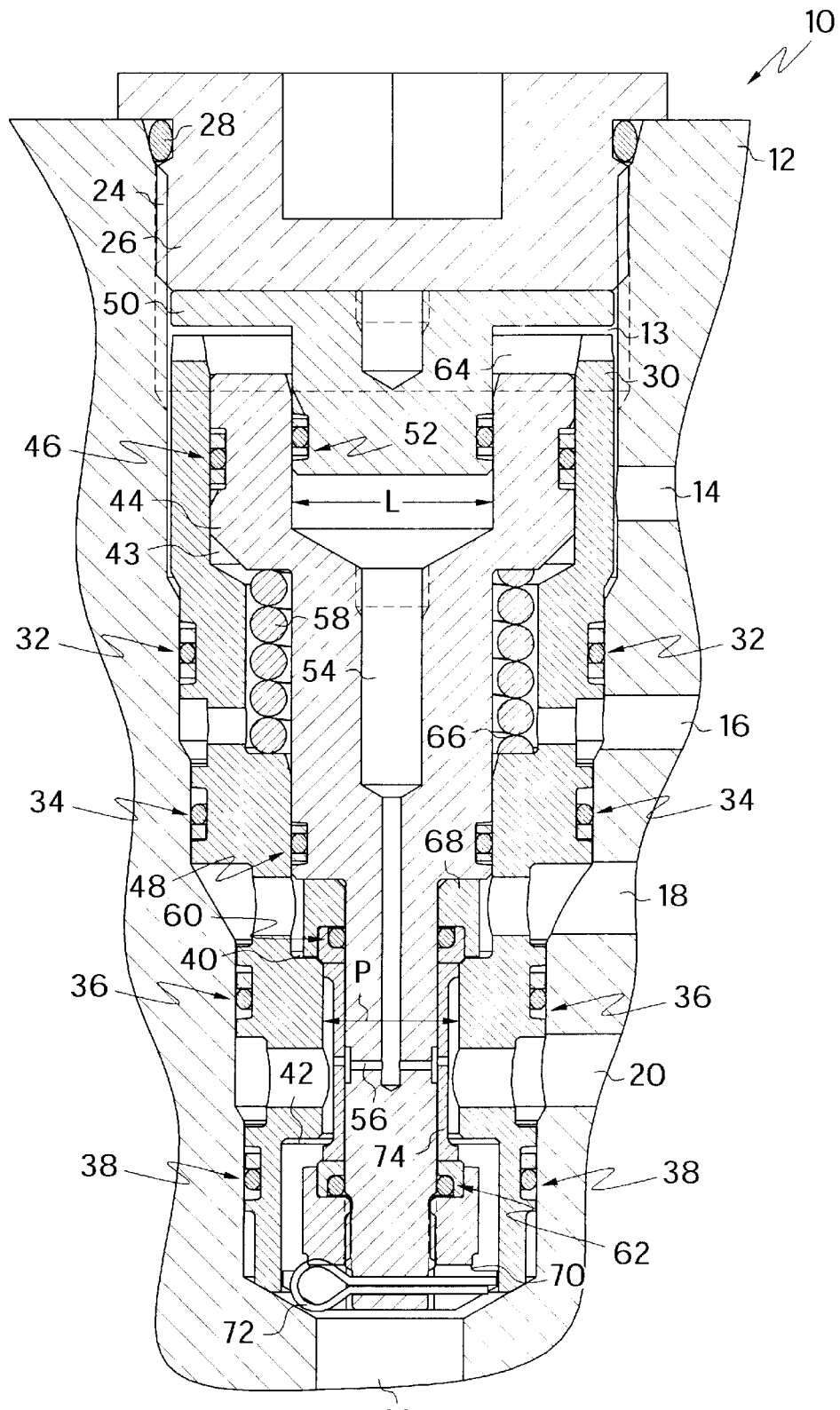
FIG. 2 is a section view of the hydraulic latching spool valve of FIG. 1, except the internal valve components are in the open position.

Referring now to the drawings and first to FIGS. 1 and 2, a preferred embodiment of the present hydraulic latching spool valve is generally designated by the numeral 10. FIG. 1 shows the spool valve 10 in the closed position, while FIG. 2 shows spool valve 10 in the open position.

In FIG. 1, a body 12 surrounds the hydraulic latching spool valve 10. The body 12 defines a valve chamber 13, a pilot open port 14, a pilot close port 16, a vent port 18, a function port 20, and a supply port 22 which are each in communication with valve chamber 13. At its upper end, valve body 12 defines a threaded access opening 24 which is adapted to threadably engage a hex plug 26 which is sealed with respect to body 12 by an o-ring 28. A valve cage 30 is inserted in the valve chamber 13 of body 12, and is sealed with respect to valve body 12 by first upper valve cage seal assembly generally identified by the numeral 32, comprised of an o-ring 27 and two flanking backup rings 25 and 29, second upper valve cage seal assembly generally identified by the numeral 34, comprised of an o-ring 31 and a backup ring 33, first lower valve cage seal assembly generally identified by the numeral 36, comprised of an o-ring 37 and a backup ring 35, and second lower valve cage seal assembly generally identified by the numeral 38, comprised of an o-ring 41 and a backup ring 39. These seal assemblies and others described herein are better seen in FIG. 3.

Valve cage 30 acts as a piston receptacle and guide, and further defines upper circular seat 40 and lower circular seat 42. The upper end of valve cage 30 defines a piston and spring section having an internal cylindrical surface which defines a piston chamber 43 for receiving a piston 44. Piston 44 has an upper cylindrical section and a lower stem section, and is sealed with respect to piston chamber 43 by first piston seal assembly generally identified by the numeral 46, comprised of an o-ring 45 and two flanking backup rings 75 and 47, and second piston seal assembly generally identified by the numeral 48, comprised of an o-ring 51 and two flanking backup rings 49 and 53. Immediately below the upper cylindrical portion of piston 44, an annular seal gland 68 is positioned about the piston stem. Seal gland 68 defines a circular seal recess adapted to receive an upper piston stem seal assembly generally identified by the numeral 60.

Upper piston stem seal assembly 60 is comprised of an o-ring 61 and a circumferential PEEK seal 63. The lower end of the stem of piston 44 maintains a lower piston stem seal assembly generally identified by the numeral 62, comprised of an o-ring 67 and a circumferential PEEK seal 65. A spacer 74 is provided in supporting engagement between upper piston stem seal assembly 60 and lower piston stem seal assembly 62. The bottom of the stem of piston 44 is also adapted to receive a gland nut 70 into which is positioned a cotter pin 72 which secures gland nut 70 against inadvertent rotation relative to the piston stem.

The top portion of piston 44 defines an opening adapted to receive stationary plug 50. Stationary plug 50 is positioned between the underside of hex plug 26 and the upper end of piston 44. Stationary plug 50 is sealed with respect to the opening in the upper end of piston 44 by latching piston seal assembly generally identified by the numeral 52, the seal assembly being comprised of an o-ring 57 and two flanking backup rings 55 and 59.

Piston 44 further defines an internal latching chamber 54, having a cylindrical shape and having a wide diameter at its upper end. Latching chamber 54 is in fluid communication with supply port 22 by means of fluid port 56 located at the lower end of piston 44. Between piston 44 and valve cage 30, a spring 58 is operably located to bias piston 44 towards the closed position.

FIG. 1 shows hydraulic latching spool valve 10 in the closed position. Lower piston stem seal assembly 62 and lower circular seat 42 are engaged, while upper piston stem seal assembly 60 and upper circular seat 40 are disengaged. Thus, vent port 18 and function port 20 are in fluid communication with one another.

FIG. 2 shows hydraulic latching spool valve 10 in the open position. Upper piston stem seal assembly 60 and upper circular seat 40 are engaged, while lower piston stem seal assembly 62 and lower circular seat 42 are disengaged. Thus, function port 20 is in fluid communication with supply port 22. Supply pressure fills latching chamber 54.

The operation of hydraulic latching spool valve 10 is as follows. The "normal" condition of hydraulic latching spool valve 10 is as shown in FIG. 1, where spring 58 maintains the valve mechanism in the closed position with lower piston stem seal assembly 62 in sealing engagement with lower circular seat 42, thus blocking supply pressure from supply port 22 from communication with function port 20. At this point, function port 20 is open to vent port 18.

To open the valve, the open pilot is pulsed, causing pilot open pressure to flow into pilot open chamber 64 and to act on the upper end of piston 44, thus driving the piston downward and moving upper piston stem seal assembly 60 into sealing engagement with upper circular seat 40. This piston and valve seal movement causes isolation of vent port 18 from function port 18 and allows supply pressure to communicate with function port 18 and latching chamber 54. This open position of hydraulic latching spool valve 10 is shown in FIG. 2.

As piston 44 moves into the open position, latching chamber 54 is also placed in fluid communication with supply port 22 by means of fluid port 56. Supply fluid enters latching chamber 54 at fluid port 56 near its lower end and fills the latching chamber. As supply fluid fills the upper end of latching chamber 54 the fluid imparts pressure against piston 44 and stationary plug 50. The effect of this pressure is to force piston 44 in a downward direction. Because of the area of the upper portion of latching chamber 54, identified by arrows "L", the force imparted by fluid in the latching chamber is sufficient to overcome the combined opposing force of spring 58 and the supply pressure impacting piston 44 at spacer 74 indicated by arrow "P". Thus, the fluid in latching chamber 54 serves to latch the valve in the open position. Pilot open pressure goes to zero psi and the valve remains open because of the differential forces acting on piston 44.

To close the valve, the close pilot is pulsed, causing pilot close pressure to flow into pilot close chamber 66. The fluid pressure in pilot close chamber 66 acts on piston 44 forcing it in an upward direction. The force of the pilot close pressure, in combination with spring 58, is sufficient to overcome the force imparted by fluid in latching chamber 54. Piston 44 moves upwardly, returning the valve to its normally closed position.

FIG. 3 is an exploded view of a preferred embodiment of the present invention. The diagram shows the orientation of each component of hydraulic latching spool valve 10 relative to the others. Beginning at the top row, left to right, the parts are: hex plug 26; o-ring 28; stationary plug 50; stationary plug seal assembly 52; first piston seal assembly 46; latching chamber 54; piston 44; spring 58; second piston seal assembly 48; seal gland 68; upper piston stem seal assembly 60; access opening 24; valve cage 30; spacer 74; lower piston stem seal assembly 62; gland nut 70; cotter pin 72; first upper valve cage seal assembly 32; second upper valve cage seal assembly 34; first lower valve cage seal assembly 36; and second lower valve cage seal assembly 38.

The invention has several advantages. Using only one moveable piston, the valve can be latched in the open position after only a brief pulse of pilot open pressure. Once the pilot open pressure is pulsed, fluid fills the latching chamber and maintains the valve in the open position even after pilot open pressure is removed. The valve remains open until pilot close pressure is applied.

Another advantage of the invention is that the risk of leakage due to the latching fluid pressure is reduced because the fluid is contained within a latching chamber located in the interior of the piston. This is preferable to the situation in which the latching fluid fills a chamber between the piston body and the valve cage because if the latching fluid fills a chamber between the piston body and the valve cage there is a risk of leakage along the various seal points between the piston body and the valve cage.

In view of the foregoing it is evident that the present invention is one well adapted to attain all of the advantages and features hereinabove set forth, together with other advantages and features which are inherent in the apparatus disclosed herein.

As will be readily apparent to those skilled in the art, the present invention may easily be produced in other specific forms without departing from its spirit or essential characteristics. The present embodiment is, therefore, to be construed as merely illustrative and not restrictive, the scope of the invention being indicated by the claims rather than the foregoing description, and all changes which come within the meaning and range of equivalence of the claims are therefore intended to be embraced therein.

What is claimed is:

1. A hydraulic latching spool valve adapted to be inserted in a valve chamber in a body, the body defining a supply port, a function port, a vent port, a pilot close port and a pilot open port, the supply port connected to a pressurized fluid source which delivers supply pressure to the spool valve, the pilot close port connected to a close pilot to deliver close fluid to the spool valve when the close pilot is pulsed and the pilot open port connected to an open pilot to deliver open fluid to the spool valve when the open pilot is pulsed, the hydraulic latching spool valve comprising:

valve cage sized and arranged to be inserted in the valve chamber of the body, the valve cage defining a first seat positioned between a valve supply port and a valve function port and a second seat positioned between the valve function port and a valve vent port;

a seal assembly carried by a movable elongate piston, the piston moving from a closed position in which the seal assembly is engaged with the first seat and disengaged with the second seat, allowing fluid communication between the valve action port and the valve vent port, and containing pressurized fluid in the valve supply port, to an open position in which the seal assembly is disengaged with the first seat and engaged with the second seat allowing, pressurized fluid to flow from the valve supply port to the valve function port and preventing pressurized fluid from flowing to the valve vent port, the elongate piston having a head and a toe;

a spring urging the movable piston into the closed position, the spring positioned in a pilot close chamber, the chamber in fluid communication with the pilot close port;

a pilot open chamber in fluid communication with the pilot open port, the pilot open chamber exerting fluid pressure on the head of the elongate movable piston and causing the piston to move from the closed position to the open position when the open pilot is actuated; and a latching chamber formed on an interior of the elongate movable piston, near the head, the latching chamber in fluid communication with supply pressure, and the latching fluid entering the latching chamber from the elongate movable piston when the valve is in the open position, the latching chamber having an area exposed to supply pressure that generates sufficient latching force to overcome the opposing forces generated by the spring and opposing forces generated by the supply pressure acting against the piston and seal assembly to hold the piston in the open position until the close pilot is pulsed and close fluid enters the pilot close chamber overcoming the latching force to close the spool valve.

2. A hydraulic latching spool valve adapted to be inserted in a valve chamber in a body, the body defining a supply port, a function port, a vent port, a pilot close port and a pilot open port, the supply port connected to a pressurized fluid source which delivers supply pressure to the spool valve, the pilot close port connected to a close pilot to deliver close fluid to the spool valve when the close pilot is pulsed and the pilot open port connected to an open pilot to deliver open fluid to the spool valve when the open pilot is pulsed, the hydraulic latching spool valve comprising:

a valve cage sized and arranged to be inserted in the valve chamber of the body, the valve cage defining a first seat positioned between a valve supply port and a valve function port and a second seat positioned between the valve function port and a valve vent port;

a seal assembly carried by a movable elongate piston, the piston moving from a closed position in which the seal assembly is engaged with the first seat and disengaged with the second seat, allowing fluid communication between the valve function port and the valve vent port, and containing pressurized fluid in the valve supply port, to an open position in which the seal assembly is disengaged with the first seat and engaged with the second seat allowing pressurized fluid to flow from the valve supply port to the valve function port, and preventing pressurized fluid from flowing to the valve vent port, the elongate piston having a head and a toe;

a spring urging the movable piston into the closed position, the spring positioned in a pilot close chamber, the chamber in fluid communication with the pilot close port;

a pilot open chamber in fluid communication with the pilot open port, the pilot open chamber exerting fluid pressure on the head of the elongate movable piston and causing the piston to move from the closed position to the open position when the open pilot is actuated; and a latching chamber formed on an interior of the elongate movable piston, near the head, the latching chamber in fluid communication with supply pressure, and the latching fluid entering the latching chamber from the elongate movable piston when the valve is in the open position, the latching chamber having an area exposed to supply pressure that generates sufficient latching force to overcome opposing forces to hold the piston in the open position after the open fluid pressure goes to zero psi in the pilot open chamber and until the close pilot is pulsed and close fluid enters the pilot close chamber overcoming he latching force to close the spool valve.

3. A hydraulic latching spool valve adapted to be inserted in a salve chamber in a body, the body defining a supply port, a function port, a vent port, a pilot close port and a pilot open port, the supply port connected to a pressurized fluid source which delivers supply pressure to the spool valve, the pilot close port connected to a close pilot to deliver close fluid to the spool valve when the close pilot is pulsed and the pilot open port connected to an open pilot to deliver open fluid to the spool valve when the open pilot is pulsed, the hydraulic latching spool valve comprising:

a valve cage sized and arranged to be inserted in the valve chamber of the body, the valve cage defining a first seat positioned between a valve supply port and a valve function port and a second seat positioned between the valve function port and a valve vent port;

a seal assembly carried by a movable elongate piston, the piston moving from a closed position in which the seal assembly is engaged with the first seat and disengaged with the second seat, allowing fluid communication between the valve function port and the valve vent port, and containing pressurized fluid in the valve supply port, to an open position in which the seal assembly is disengaged with the first seat and engaged with the second seat allowing pressurized fluid to flow from the valve supply port to the valve function port, and preventing pressurized fluid from flowing to the valve vent port, the elongate piston having a head and a toe;

a spring urging the movable piston into the closed position, the spring positioned in a pilot close chamber, the chamber in fluid communication with the pilot close port;

a pilot open chamber in fluid communication with the pilot open port, the pilot open chamber exerting fluid pressure on the head of the elongate movable piston and causing the piston to move from the closed position to the open position when the open pilot is actuated; and a latching chamber formed on an interior of the elongate movable piston, near the head, the latching chamber in fluid communication with supply pressure, and the latching fluid entering the latching chamber from the elongate movable piston when the valve is in the open position, the latching chamber having an area exposed to supply pressure that is large enough to hold the piston in the open position after the open pilot has been pulsed and until the close pilot is pulsed and close fluid enters the pilot close chamber overcoming the forces acting on the latching chamber to close the spool valve.

4. A hydraulic latching spool valve adapted to be inserted in a valve chamber in a body, the body defining a supply port, a function port, a vent port, a pilot close port and a pilot open port, the supply port connected to a pressurized fluid source which delvers supply pressure to the spool valve, the pilot close port connected to a close pilot to deliver close fluid to the spool valve when the close pilot is pulsed and the pilot open port connected to an open pilot to deliver open fluid to the spool valve when the open pilot is pulsed, the hydraulic latching spool valve comprising:

a valve cage sized and arranged to be inserted in the valve chamber of the body, the valve cage defining a first seat positioned between a valve supply port and a valve function port and a second seat positioned between the valve function port and a valve vent port;

a seal assembly carried by a movable elongate piston, the piston moving from a closed position in which the seal assembly is engaged with the first seat and disengaged with the second seat, allowing fluid communication between the valve function port and the valve vent port, and containing pressurized fluid in the valve supply port, to an open position in which the seal assembly is disengaged with the first seat and engaged with the second seat allowing pressurized fluid to flow from the valve supply port to the valve function port, and preventing pressurized fluid from flowing to the valve vent port, the elongate piston having a head and a toe;

a spring urging the movable piston into the closed position, the spring positioned in a pilot close chamber, the chamber in fluid communication with the pilot close port;

a pilot open chamber in fluid communication with the pilot open port, the pilot open chamber exerting fluid pressure on the head of the elongate movable piston and causing the piston to move from the closed position to the open position when the open pilot is actuated; and a latching chamber formed on an interior of the elongate movable piston, near the head, the latching chamber in fluid communication with supply pressure, and the latching fluid entering the latching chamber from the elongate movable piston when the valve is in the open position, the latching chamber having an area acted upon by supply pressure that is greater than the opposing area of the piston and seal assembly that is acted upon by supply pressure to create a superior force against the piston in the latching chamber to hold the piston in the open position after the open pilot has been pulsed and the open fluid pressure goes to zero psi in the pilot open chamber and until the close pilot is pulsed and close fluid enters the pilot close chamber overcoming the forces acting on the latching chamber to close the spool valve.

5. A hydraulic latching spool valve connected to a pressurized fluid source which delivers supply pressure to the spool valve, a close pilot to deliver close fluid to the spool valve when the close pilot is pulsed and an open pilot to deliver open fluid to the spool valve when the open pilot is pulsed, the hydraulic spool valve comprising:

a body defining a valve chamber, a supply port, a function port, a vent port, a pilot close port and a pilot open port, the supply port connected to the pressurized fluid source, the pilot close port connected to a close pilot and the pilot open port connected to an open pilot;

a valve cage sized and arranged to be inserted in the valve chamber of the body, the valve cage defining a first seat positioned between a valve supply port and a valve function port and a second seat positioned between the valve function port and a valve vent port;

a seal assembly carried by a movable elongate piston, the piston moving from a closed position in which the seal assembly is engaged with the first seat and disengaged with the second seat, allowing fluid communication between the valve function port and the valve vent port, and conning pressurized fluid in the valve supply port, to an open position in which the seal assembly is disengaged with the first seat and engaged with the second seat allowing pressurized fluid to flow from the valve supply port to the valve function port, and preventing pressurized fluid from flowing to the valve vent port, the elongate piston having a head and a toe;

a spring urging the movable piston into the closed position, the spring positioned in a pilot close chamber, the chamber in fluid communication with the pilot close port;

a pilot open chamber in fluid communication with the pilot open port, the pilot open chamber exerting fluid pressure on the head of the elongate movable piston and causing the piston to move from the closed position to the open position when the open pilot is actuate; and a latching chamber formed on an interior of the elongate movable piston, near the head, the latching chamber in fluid communication with supply pressure, and the latching fluid entering the latching chamber from the elongate movable piston when the valve is in the open position, the latching chamber having an area exposed to supply pressure that generates sufficient latching pressure to overcome the opposing forces generated by the spring and opposing forces generated by the supply pressure acting against the piston and seal assembly to hold the piston in the open position until the close pilot is pulsed and close fluid enters the pilot close chamber overcoming the latching force to close the spool valve.

6. A hydraulic latching spool valve connected to a pressurized fluid source which delivers supply pressure to the spool valve, a close pilot to deliver close fluid to the spool valve when the close pilot is pulsed and an open pilot to deliver open fluid to the spool valve when the open pilot is pulsed, the hydraulic spool valve comprising:

a body defining a valve chamber, a supply port, a function port, a vent port, a pilot close port and a pilot open port, the supply port connected to the pressurized fluid source, the pilot close port connected to a close pilot and the pilot open port connected to an open pilot;

a valve cage sized and arranged to be inserted in the valve chamber of the body, the valve cage defining a first seat positioned between a valve supply port and a valve function port and a second seat positioned between the valve function port and a valve vent port;

a seal assembly carried by a movable elongate piston, the piston moving from a closed position in which the seal assembly is engaged with the first seat and disengaged with the second seat, allowing fluid communication between the valve function port and the valve vent port, and containing pressurized fluid in the valve supply port, to an open position in which the seal assembly is disengaged with the first seat and engaged with the second seat allowing pressurized fluid to flow from the valve supply port to the valve function port, and preventing pressurized fluid from flowing to the valve vent port, the elongate piston having a head and a toe;

a spring urging the movable piston into the closed position, the spring positioned in a pilot close chamber, the chamber in fluid communication with the pilot close port;

a pilot open chamber in fluid communication with the pilot open port, the pilot open chamber exerting fluid pressure an the head of the elongate movable piston and causing the piston to move from the closed position to the open position when the open pilot is actuated; and a latching chamber formed on an interior of the elongate movable piston, near the head, the latching chamber in fluid communication with supply pressure, and the latching fluid entering the latching chamber from the elongate movable piston when the valve is in the open position, the latching chamber having an area exposed to supply pressure that generates sufficient latching force to overcome opposing forces to hold the piston in the open position after the open fluid pressure goes to zero psi in the pilot open chamber and until the close pilot is pulsed and close fluid enters the pilot close chamber overcoming the latching force to close the spool valve.

7. A hydraulic latching spool valve connected to a pressurized fluid source which delivers supply pressure to the spool valve, a close pilot to deliver close fluid to the spool valve when the close pilot is pulsed and an open pilot to deliver open fluid to the spool valve when the open pilot is pulsed, the hydraulic spool valve comprising:

a body defining a valve chamber, a supply port, a function port, a vent port, a pilot close port and a pilot open port, the supply port connected to the pressurize fluid source, the pilot close port connected to a close pilot and the pilot open port connected to an open pilot;

a valve cage sized and arranged to be inserted in the valve chamber of the body, the valve cage defining a first seat positioned between a valve supply port and a valve function port and a second seat positioned between the valve function port and a valve vent port;

a seal assembly carried by a movable elongate piston, the piston moving from a closed position in which the seal assembly is engaged with the first seat and disengaged with the second seat, allowing fluid communication between the valve function port and the valve vent port, and containing pressurized fluid in the valve supply port, to an open position in which the seal assembly is disengaged with the first seat and engaged with the second seat allowing pressurized fluid to flow from the valve supply port to the valve function port, and preventing pressurized fluid from flowing to the valve vent port, the elongate piston having a head and a toe;

a spring urging the movable piston into the closed position, the spring positioned in a pilot close chamber, the chamber in fluid communication with the pilot close port;

a pilot open chamber in fluid communication with the pilot open port, the pilot open chamber exerting fluid pressure on the head of the elongate movable piston and causing the piston to move from the closed position to the open position when the open pilot is actuated; and a latching chamber formed on an interior of the elongate movable piston, near the head, the latching chamber in fluid communication with supply pressure, and the latching fluid entering the latching chamber from the elongate movable piston when the valve is in the open position, the latching chamber having an area exposed to supply pressure that is large enough to hold the piston in the open position after open pilot has been pulsed and until the close pilot is pulsed and close fluid enters the pilot close chamber overcoming the forces acting on the latching chamber to close the spool valve.

8. A hydraulic latching spool valve connected to a pressurized fluid source which delivers supply pressure to the spool valve, a close pilot to deliver close fluid to the spool valve when the close pilot is pulsed and an open pilot to deliver open fluid to the spool valve when the open pilot is pulsed, the hydraulic spool valve comprising:

a body defining a valve chamber, a supply port, a function port, a vent port, a pilot close port and a pilot open port, the supply port connected to the pressurized fluid source, the pilot close port connected to a close pilot and the pilot open port connected to an open pilot;

a valve cage sized and arranged to be inserted in the valve chamber of the body, the valve cage defining a first seat positioned between a valve supply port and a valve function port and a second seat positioned between the valve function port and a valve vent port;

a seal assembly carried by a movable elongate piston, the piston moving from a closed position in which the seal assembly is engaged with the first seat and disengaged with the second seat, allowing fluid communication between the valve function port and the valve vent port, and containing pressurized fluid in the valve supply port, to an open position in which the seal assembly is disengaged with the first seat and engaged with the second seat allowing pressurized fluid to flow from the valve supply port to the valve function port, and preventing pressurized fluid from flowing to the valve vent port, the elongate piston having a head and a toe;

a spring urging the movable piston into the closed position, the spring positioned in a pilot close chamber, the chamber in fluid communication with the pilot close port;

a pilot open chamber in fluid communication with the pilot open port, the pilot open chamber exerting fluid pressure on the head of the elongate movable piston and causing the piston to move from the closed position to the open position when the open pilot is actuated; and a latching chamber formed on an interior of the elongate movable piston, near the head, the latching chamber in fluid communication with supply pressure, and the latching fluid entering the latching chamber from the elongate movable piston when the valve is in the open position, the latching chamber having an area acted upon by supply pressure that is greater than the opposing area of the piston and seal assembly that is acted upon by supply pressure to create a superior force against the piston in the latching chamber to hold the piston in the open position after the open pilot has been pulsed and the open fluid pressure goes to zero psi in the pilot open chamber and until the close pilot is pulsed and close fluid enters the pilot close chamber overcoming the forces bug acting on the latching chamber to close the spool valve.

* * * * *

UNITED STATES PATENT AND TRADEMARK OFFICE
CERTIFICATE OF CORRECTION

PATENT NO. : 6,497,251 B1
DATED : December 24, 2002
INVENTOR(S) : Watson, Richard R.

It is certified that error appears in the above-identified patent and that said Letters Patent is hereby corrected as shown below:

Title page,
Item [57], Abstract,
Line 11, delete "sprig" and replace with -- spring --;

Column 7,
Line 2, delete "salve" and replace with -- valve --;

Column 12,
Line 15, delete "bug".

Signed and Sealed this

Sixth Day of July, 2004

JON W. DUDAS
*Acting Director of the United States Patent and Trademark Office*